April 21, 1942.  E. ATTESLANDER  2,280,364
VIBRATION DAMPENING DEVICE
Filed May 17, 1939
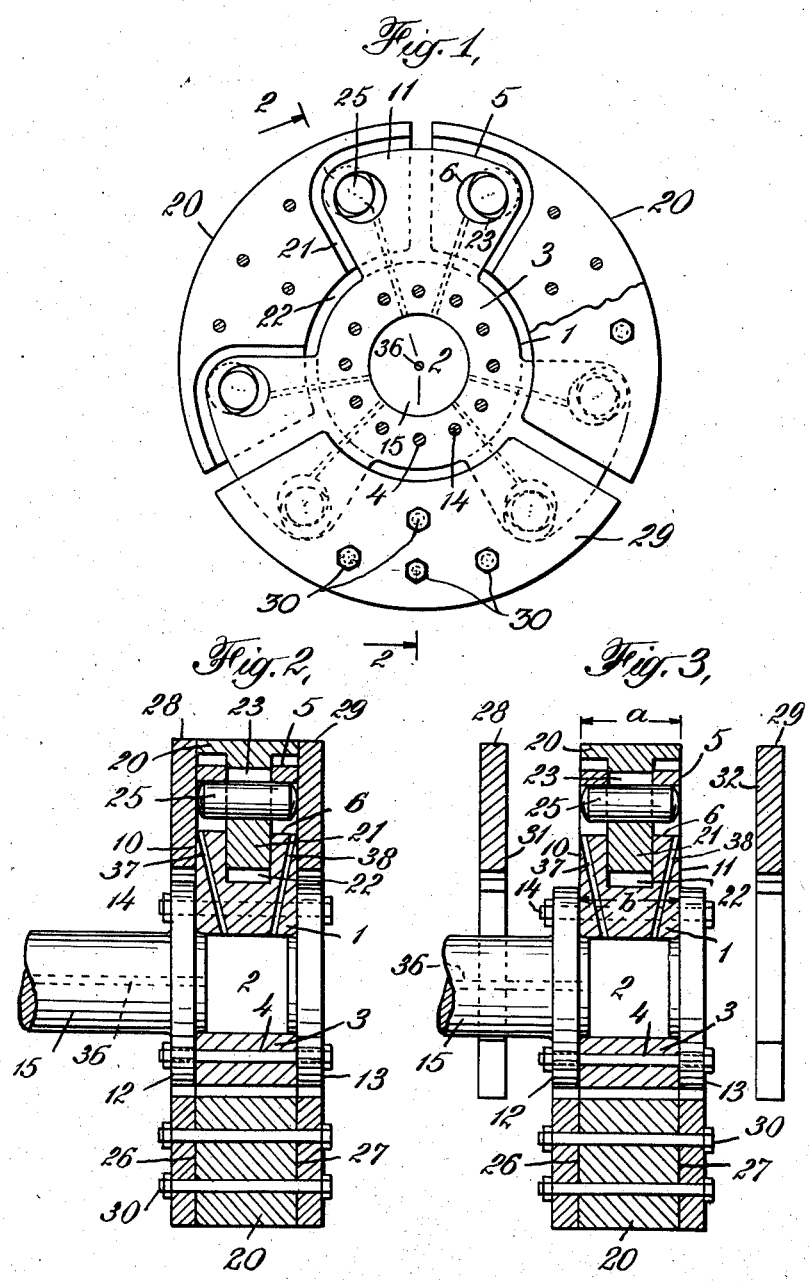
INVENTOR
Edouard Atteslander
BY
Pennie, Davis, Marvin & Edmonds
ATTORNEYS Patented Apr. 21, 1942

2,280,364

UNITED STATES PATENT OFFICE 2,280,364

VIBRATION DAMPENING DEVICE

Edouard Atteslander, Winterthur, Switzerland, assignor to Sulzer Frères, Société Anonyme, Winterthur, Switzerland Application May 17, 1939, Serial No. 274,077
In Switzerland January 18, 1939

8 Claims. (Cl. 74—574)

This invention relates to a device for dampening torsional vibration in shafts and has for its object the provision of an improved device of this character.

It heretofore has been proposed to damp torsional oscillations by means of devices having loose masses subject to centrifugal force, which masses are connected by means of two or more rolling bodies or members with an oscillating part carrying roller paths fixed to the shaft, with the loose masses having auxiliary masses provided with rolling paths for roller bodies. In such devices, if the crank shaft is caused to oscillate in the axial direction by disturbing forces, the swinging mass may seize or jam.

According to the present invention the devices for diminishing torsional vibrations by means of oscillating masses is provided with means to prevent longitudinal vibrations of the shaft disturbing the oscillating movements which occur in a plane perpendicular to the axis of the shaft.

In devices made in accordance with the present invention, at least one part of the surfaces subject to the axial pressures can be ground in one plane at right angles to the axis of that shaft, and the supporter of the mass may be formed in such a way that the lateral faces of the parts which simultaneously receive pressure in one given direction can be ground flat in one working operation. Also, all faces subject to relative motions and to axial pressure may consist of a material having good running characteristics.

The accompanying drawing illustrates more or less schematically a dampening device embodying the invention, in which:

Fig. 1 is an end view with parts removed;

Fig. 2 is a view partly in section taken along the line 2—2 of Fig. 1; and

Fig. 3 is a view similar to Fig. 2 with parts removed.

The device illustrated in the drawing comprises a base member 1 having a central opening 2, a hub portion 3 having any suitable number of bolt holes 4, and three equally spaced arms 5 extending radially from the hub portion having holes 6 towards the periphery that are equi-distant from the center of the hub. The base member has parallel sides 10 and 11 to which the flanged ends 12 and 13 of the shaft are connected respectively by means of bolts 14 passed through the holes 4. The stub of one shaft 15 is shown. The arms 5 preferably flare outwardly fanlike and the parallel plane surfaces 10 and 11 are accurately machined and highly polished.

The mass part 20 of each oscillatable member is formed to provide at each end thereof a central lug 21 arranged to fit into a channel 22 in each of the arms of the base member. Each lug has a hole 23 at each end preferably of the same diameter as the hole 6. The mass parts when assembled as illustrated are coupled to the base member by rollers or pins 25 of smaller diameter than the holes 6 and 23. The difference in the diameters of the holes 6 and 23 and the rollers 25 provides sufficient movement of the oscillatable members to dampen vibration. Each mass part has flat parallel sides 26 and 27 and the distance $a$ therebetween is slightly greater than the distance $b$ measured across the base member.

Each mass part has side plates or braces 28 and 29 attached respectively to the sides 26 and 27 by bolts 30, and since the distance $a$ is greater than the distance $b$, the inner plane surfaces 31 and 32 of the side plates have sufficient clearance to effect freely slidable contact with the surfaces 10 and 11 of the base member and to permit suitable lubrication therebetween. The plane surfaces 31 and 32 are accurately machined and highly polished to minimize frictional resistance in their sliding engagement with the surfaces 10 and 11. The side plates guide the movement of the mass part, take up the axial thrusts of the shaft, and also close the joints and secure the rollers in position.

Space 2 within the hub is supplied with lubricating oil under pressure through the duct 36 in the shaft 15. Suitable oil ducts 37 and 38 are formed through each arm of the base member to carry the lubricating oil to the chamber 39 from which it is freely distributed to the plane contact surfaces of the oscillatable members and to the friction surfaces of the rollers 25. The clearances between the lugs 21 and the channels 22 are very small and are shown in exaggerated proportions in the drawings; actually the clearance is approximately 0.4 mm. The oil is slowly forced outwardly in the directions of the arrows $p$ in the same manner as oil is forced outwardly from bearings under pressure lubrication. When the device is mounted upon the shaft of an engine, it is inside the crankcase and the oil is permitted to squirt out into the crankcase as it generally does in bearings under pressure lubrication and similarly located. Of course, where the device is used on open shafts, any suitable housing may be provided to collect the oil.

All elements or members of the device which are subjected to relative movements and axial pressure are preferably formed of metal having high resistance to wear, such as hardened carbon steel. This is especially true of the base member and side plates which have polished contact surfaces. The mass parts of the oscillatable members are not subjected to excessive frictional wear and may be formed of any suitable metal, preferably a metal of high specific gravity, for example, bronze, hard lead, or a mixture of these.

In order to form the plane surfaces with the necessary uniformity and smoothness, the base member and the side plates of the oscillatable members are ground in planes vertical to the axis of the shaft.

The three oscillatable members are equally dimensioned, and balanced with respect to mass, and are similarly positioned and spaced radially and circumferentially.

I claim:

1. A device for dampening torsional vibration in shafts which comprises a base member rigidly fixed to the shaft having two parallel plane surfaces at right angles to the shaft, a plurality of oscillatable members loosely coupled to the base member each having two parallel plane surfaces at a distance apart somewhat greater than the distance between the two parallel plane surfaces of the base member, two side plates each with a plane surface fixed to one of the plane surfaces of an oscillatable member and engaging in slidable contact one of the two parallel plane surfaces of the base member.

2. A shaft vibration damper which comprises a base member arranged to be connected to the shaft, a plurality of spaced arms extending radially from the central portion of the base member, each arm having two parallel plane surfaces at right angles to the axis of the shaft, two holes through each arm extending in the direction of the shaft axis, a plurality of oscillatable members each having two parallel plane faces and two guide plates with at least one plane face attached one on each plane face of the oscillatable member, the distance between the inner surfaces of the guide plates being slightly greater than the distance between the parallel plane surfaces of the arms, two holes in each oscillatable member spaced relatively far apart, each oscillatable member being arranged to be connected to two of the arms with one hole coincident with one hole of each arm, and a pin of considerably smaller diameter than the holes inserted in the coincident holes thus loosely coupling each oscillatable member to two arms, the inner surfaces of the guide plates being smooth and arranged to be in slidable contact with the plane surfaces of the arms.

3. A damper according to claim 2 in which the mass part is of metal of high specific gravity.

4. A damper according to claim 2 in which the holes in the arms are radially equi-distant from the center of the base member and the corresponding holes of the arms are circumferentially equally spaced.

5. A damper according to claim 2 in which each oscillatable member is equally dimensioned, and balanced with respect to mass.

6. A device for dampening torsional vibration in shafts which comprises a base member rigidly fixed to the shaft having two parallel plane surfaces at right angles to the shaft, a plurality of oscillatable members loosely coupled to the base member each having two parallel plane surfaces at a distance apart somewhat greater than the distance between the two parallel plane surfaces of the base member, two side plates each with a plane surface fixed to one of the plane surfaces of an oscillatable member and engaging in slidable contact one of the two parallel plane surfaces of the base member, and means for lubricating the plane surfaces.

7. A device for dampening torsional vibration in shafts which comprises a base member rigidly fixed to the shaft having a hub, a plurality of equally spaced arms extending radially from the hub having two parallel sides at right angles to the axis of the shaft the surfaces of which are accurately machined and highly polished to plane surfaces, two holes through each arm in the direction of the shaft axis, an oscillatable member having two holes coupled to each of two adjacent arms, by means of a pin loosely fittted in one of the holes in the oscillatable member and in one of the holes in each arm, each oscillatable member having two parallel sides the surfaces of which are accurately machined to plane surfaces, and two side plates each attached with one of its sides which is accurately machined to a plane surface to one of the plane surfaces of each oscillatable member and arranged to effect guided slidable contact with a plane surface of the base member.

8. A device for dampening torsional vibrations in shafts which comprises a base member fixed to the shaft having a plurality of equally spaced projecting arms and parallel exterior plane surfaces extending transverse to the axis of the shaft, two holes through each arm in the direction of the shaft axis, a plurality of oscillatable members of relatively great mass each of which has two holes of substantially the same diameter as the holes in the arms, each oscillatable member being arranged to span the space between the adjacent arms in such manner that one hole of each oscillatable member is coincident with one hole of each arm, a pin of smaller diameter than the holes inserted through the coincident holes, thus providing a loose coupling of each oscillatable member to two arms, and two side plates each attached with one of its sides which is accurately machined to a plane surface to one of the plane surfaces of each oscillatable member and arranged to effect guided slidable contact with a plane surface of the base member.

EDOUARD ATTESLANDER.